Sept. 3, 1963       E. E. ZIEGLER       3,102,551
ADJUSTABLE WATER LEVEL CONTROL FOR CLOTHES WASHING MACHINES
Filed March 7, 1962                    3 Sheets-Sheet 1

INVENTOR.
EDWIN E. ZIEGLER
BY
Marvin M. Chaban
ATTORNEY

Sept. 3, 1963  E. E. ZIEGLER  3,102,551
ADJUSTABLE WATER LEVEL CONTROL FOR CLOTHES WASHING MACHINES
Filed March 7, 1962  3 Sheets-Sheet 2
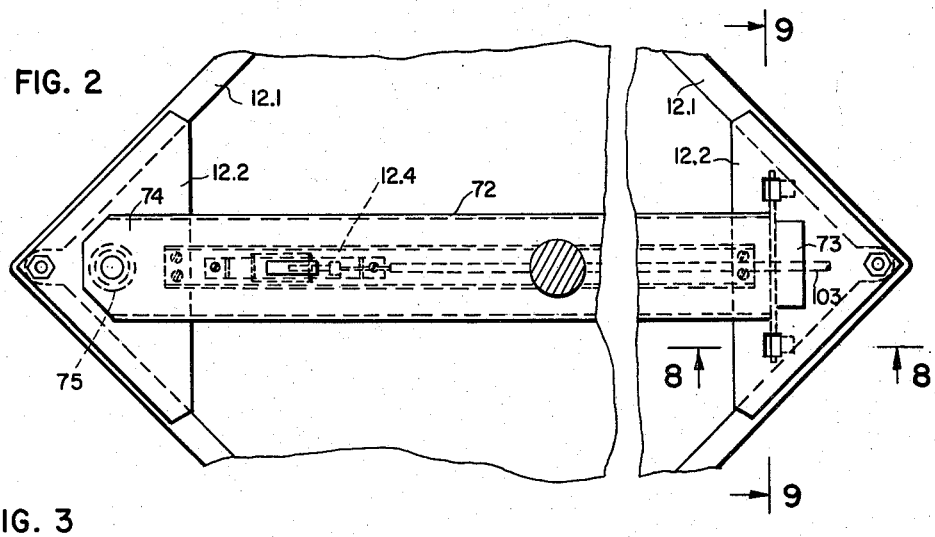
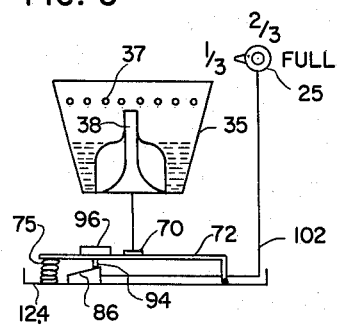
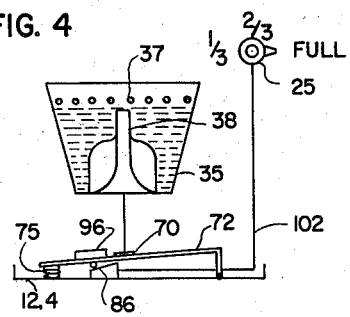
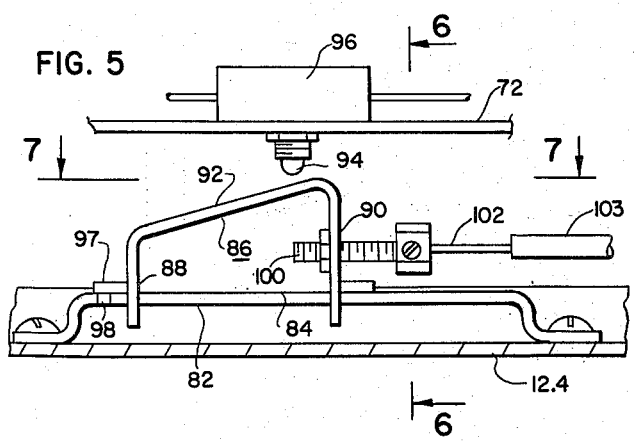
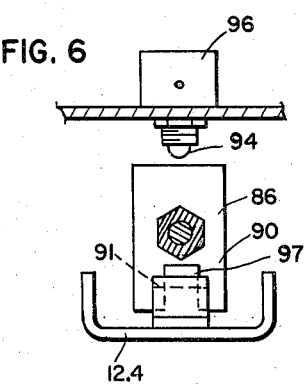
INVENTOR.
EDWIN E. ZIEGLER
BY
Marvin M. Chaban
ATTORNEY Sept. 3, 1963          E. E. ZIEGLER          3,102,551

ADJUSTABLE WATER LEVEL CONTROL FOR CLOTHES WASHING MACHINES

Filed March 7, 1962          3 Sheets-Sheet 3

INVENTOR.
EDWIN E. ZIEGLER
BY
Marvin M Chaban
ATTORNEY

United States Patent Office 3,102,551
Patented Sept. 3, 1963

3,102,551
ADJUSTABLE WATER LEVEL CONTROL FOR CLOTHES WASHING MACHINES
Edwin E. Ziegler, Schenectady, N.Y., assignor to General Electric Company, a corporation of New York
Filed Mar. 7, 1962, Ser. No. 178,100
8 Claims. (Cl. 137—408)

This invention relates to automatic washing machines and more particularly to a washing machine water fill control system which is adjustable to supply only the amount of inlet water required by the user.

In clothes washing machines it has long been the practice to fill the machine with inlet water on a timed basis. Thus, for full fill, a predetermined time is set and for a partial fill, a fixed percentage of the full fill time is set. The amount of water flow during a fixed time interval is obviously subject to the inlet water pressure and the time period is based on an optimum inlet pressure. If the inlet pressure varies greatly from the optimum value, as may be the case where wells are used as the water supply, the amount of water supplied to the machine will also vary. It has therefore become a more prevalent practice in the washing machine art to incorporate positive fill sensing devices based on the actual quantity of liquid received by the wash basket. Such systems have generally employed float switches or pressure sensing mechanisms such as diaphragms and air column tubes. Such devices are useful for indicating or sensing the full fill in any type of machine since the amount of liquid overflowed to the outer tub may be sensed readily to thereafter stop the supply of inlet water. For partial loads, such devices are only applicable to double tub or perforate basket constructions, for only in such machines will the partial fill provide a ready indication measurable directly in a simple manner.

In imperforate basket washing machines, full fill may readily be obtained by measuring the amount of overflow from the basket and providing means which react to such overflow. Partial load filling becomes a problem since sensors such as float switches and diaphragms which are located externally of the basket cannot detect a partially filled basket without the use of expensive mechanisms. To alleviate these problems, weight sensing systems have become known and used. These systems are adjusted to the tare weight of the basket and its assembly and will sense and react to a predetermined amount of weight above the tare to effect the termination of the fill. Some weight sensing systems, such as that shown in U.S. Patent 2,909,050, issued to H. K. Leach on October 20, 1959, are devised to provide in addition to the full fill, one partial fill selection. This selection is attained by pre-loading the basket assembly to provide a single partial fill which is a predetermined percentage of the full fill.

It is therefore an object of the invention to provide in a clothes washing machine, a positive sensing water fill control system which allows the user to select any of several levels of wash water in the basket.

It is another object of the invention to utilize the sensing of the weight of water fill in a clothes washing machine to effect the termination of the water fill, and to provide a means of selectively adjusting the termination point of the fill to allow the selection of one of a plurality of partial fills.

It is a further object of the invention to provide a weight responsive mechanism in a clothes washing machine in which the response level of the mechanism may be varied through the use of a cam surface of variable height which may be set to a level indicative of a fill quantity desired by the user. As the basket fills with liquid, a structure is depressed a predetermined amount by the weighted basket and as the fill reaches the amount representative of the set level, the structure will engage the cam surface thereby to actuate a water supply termination mechanism.

To provide these and other objects, the present invention comprehends the use of a clothes washing machine of the imperforate basket type in which the basket, and the basket transmission assembly are supported on a pivoted beam. The beam is pivoted at one corner of the machine and extends to the diagonally opposite corner where the beam is supported on a calibrated compression spring. Mounted on the beam intermediate between the works assembly support and the spring is a snap switch which has an actuating button depending therefrom. Said switch is in the control circuit of the water inlet system. When the inflowing water increases the weight of the assembly, the beam is depressed against the bias of the spring. The switch actuating button is lowered by this beam depression toward an actuating cam below the switch button. As the switch button is displaced following engagement with the cam surface, it opens the switch, causing the water inlet valve to be shut off. Manually settable means are provided for varying the spacing between the cam surface and the switch button and thereby to vary the amount of depression necessary for engagement of the button and cam surface. To provide this variability, the cam is in the form of an inclined plane or ramp which may be moved laterally to vary the height of the plane adjacent the engaging button of the switch. To effect this lateral movement, the cam is connected to a flexible wire which leads to a selection knob on the control console of the machine. As presently detailed, adjustment of the knob displaces the cam relative to the switch button to cause slide motion of the inclined plane a like amount to effect the requisite spacing between the cam surface and the switch button.

The invention both as to its organization and method of operation, and the features and advantages thereof, will become apparent from the detailed description of the invention viewed in connection with the accompanying drawings in which:

FIG. 2 is a broken horizontal section taken along line 2—2 of FIG. 1;

FIG. 3 is a schematic simplified drawing of the operation of my invention in a partial fill condition;

FIG. 4 is a schematic simplified drawing of the operation of my invention with a full fill condition;

FIG. 5 is a side sectional elevation of the switch and switch actuating mechanism;

FIG. 6 is a right side sectional view of the structure of FIG. 5;

Figure 1:
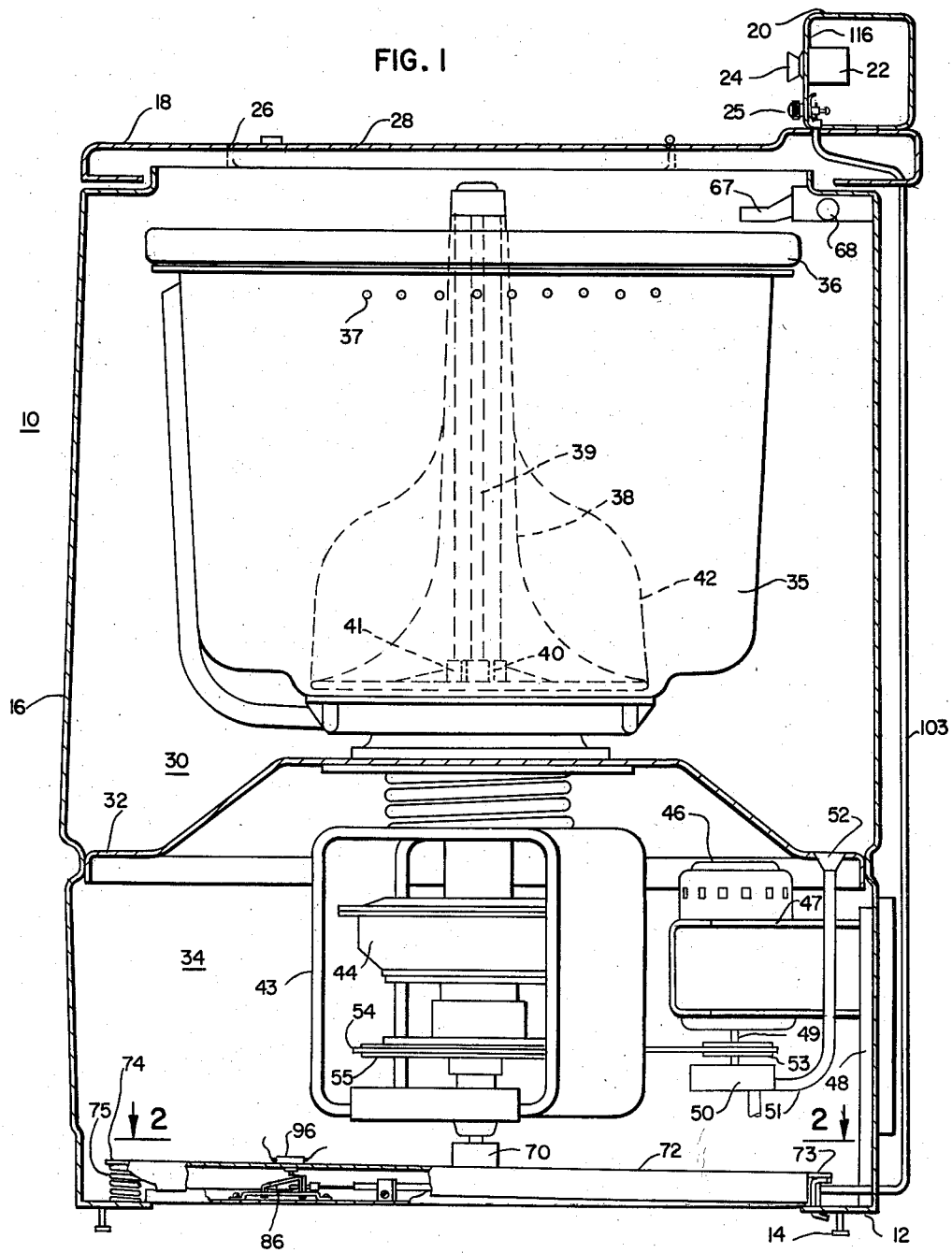
FIG. 1 is a vertical side elevational view through a washing machine utilizing my invention.
Figure 7:
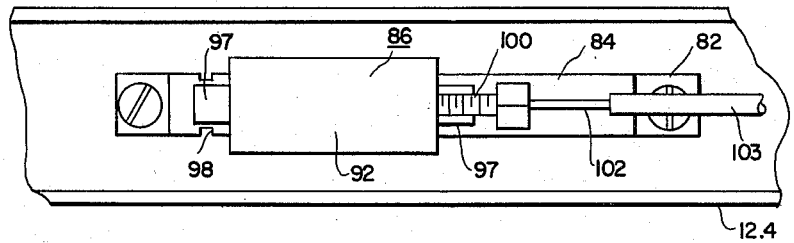
FIG. 7 is a plan view of the switch actuating mechanism of FIG. 5 viewed along line 7—7 of FIG. 5.

Referring now to FIG. 1 of the drawings, the clothes washing machine 10 there illustrated, is of the generally known imperforate spin basket type. More particularly, the machine 10 comprises a substantially rectangular base 12 that is supported upon independently adjustable feet 14 arranged to engage the floor or other supporting surface. An enclosing housing or outer casing 16 is removably carried by the base 12 and includes a conventional wrap around element including front, side and top walls. The sides of the top wall 18 are substantially flush with the side walls of housing 16 to form an upright substantially rectangular structure. At the rear of the top wall 18 is mounted a vertically extending backsplasher 20 which serves as a control console. The inner portion of this console contains the control mechanisms 22 for initiating a cycle of the proper length and type. By way of simplified example, there is shown a timer control knob 24 which is rotatable manually to set control mechanism 22 for a properly operative cycle of the desired length. Also mounted on console 20 is a control knob 25 for adjusting the input water fill as will be more fully explained later.

A substantially centrally disposed top opening 26 is provided in top wall 18 in order to render the interior of the housing 16 accessible. A conventional lid 28 is provided for the purposes of selectively closing the top opening 26; the lid being hinged to top wall 18 at its rear edge and movable thereabout from a closed position to an open position allowing access to the interior of the casing 16 for loading or unloading the machine.

A generally rectangular collection chamber or drain tub 30 is provided in the upper portion of housing 16. The bulkhead 32 defining the lower wall of chamber 30 is welded or otherwise suitably sealed to the inner wall of the housing, and spaced a distance above base 12 to define a machinery compartment 34 arranged in the lower portion of housing 16. Within this compartment there are located the machine elements necessary to drive the machine and its components through a cycle.

Centrally positioned within collection chamber 30 and mounted for rotation about a substantially vertical axis is the upstanding spin basket 35. The spin basket is generally imperforate, of the single walled type and has an open face adjacent the top access opening of the casing 16 to allow access to the basket interior. About the periphery of the basket adjacent the open face, there is secured an annular balance ring 36 of high density material providing a comparatively large moment of inertia for the basket. The spin basket 35 is provided with an upwardly and outwardly flared sidewall that terminates, as mentioned, below the access opening. Near its upper periphery, basket 35 contains a horizontally aligned series of apertures or slots 37 for centrifugally ejecting water from the basket. At the center of the spin basket there is positioned a vertical agitator 38 which is mounted coaxially on the agitator shaft 39 and is oscillated thereby. Also mounted coaxially about the agitator shaft is a tubular spinner shaft 40 whose upper end terminates a few inches above the spin basket lower surface. This spinner shaft is used to impart rotative motion to the spin basket and to further this end, the spin shaft is firmly secured to the spin basket at hub 41. The lower end of spin shaft 40 is mounted securely to the upper surface of transmission housing 44 so that the spin shaft and spin basket are co-rotative with the transmission housing 44. Exteriorly of the cylindrical body of the agitator 38 are positioned a plurality of radially extending conventional agitator vanes 42 adapted to be oscillated by oscillation of the agitator shaft.

Within the machinery compartment are located the machine elements necessary to drive the agitator and basket. These elements include a centrally positioned support structure 43 which serves as the foundation for supporting the transmission casing 44 of a distance above base 12. This support structure 43 comprises an open rectangle secured about and protecting the transmission casing 44. Within the transmission casing there is housed the drive linkage (not shown) necessary to transmit the motive power from drive motor 46 to driven mechanism. These linkages may take any suitable form known in the art.

To drive the mechanism shown there is provided a main drive motor 46. Motor 46 may, as shown, be mounted to the cabinet rear wall by a channel beam 47 which in turn is affixed to an upright reinforcing member 48. With this form of motor support on the cabinet the motor weight is isolated from the basket support for reasons which will be discussed more fully. The motor 48 is positioned in inverted fashion with its output shaft 49 depending from the motor structure. Secured about the motor shaft is a coupling to a drain pump 50 of any generally known type. The pump may preferably have its impeller fastened directly to the motor shaft so that the pump may expel waste water on rotation of the motor in one direction. A drain line 51 with an opening 52 in bottom bulkhead 52 provides a path for expelling drain water from collection chamber 30. The motor shaft 49 has mounted to it a pulley sheave 53 which carries a flexible V belt 54. This V belt is also laced about a pulley sheave 55 of the transmission housing 44, to impart driving effect thereto. The transmission housing 44 is mounted in parallel relationship to the motor 46 and has extending upwardly from its internal transmission linkages, the central agitator shaft 39 which in its upward extent protrudes through the bearing retainer structure and into the collection chamber 30.

The main drive motor 46 comprises a reversible induction motor of the split phase type which may be of the two-speed type, but for simplicity will be described herein as a single-speed motor. The motor, a typical appliance motor, has a rating of about ⅓ horsepower and an operating speed at full load of about 1,725 r.p.m. The motor, in generally known fashion, may be energized through selectable circuitry for rotation in the clockwise or counterclockwise direction to effectuate the necessary agitate and spin operations.

In addition, the general construction of washing machine 10 includes a water inlet conduit 67 with an opening poised above the open top of basket 35 for feeding inlet water to the basket under the control of water inlet solenoid 68. The single solenoid 68 is shown representatively to illustrate generally the operation of water fill; in actuality, separate valve controlling solenoids for both hot and cold water would be employed in a conventional manner. The hot and cold water solenoids would then be selectable individually or jointly to supply hot, warm or cold water.

From the foregoing it can be understood that basket 35 and its contents are supported through spin shaft 40. The transmission mechanism 44 and its allied support structure 43 serve as a support for the spin shaft and they in turn are supported within a socket or bearing member 70 at a central point slightly above the machine base. Thus, the entire weight of the basket 35, and the transmission mechanism 44 is concentrated on this socket. As can be seen in FIG. 1, the socket 70 is in turn securely mounted on a horizontally extending pivoted beam 72 which is spaced a short distance above base 12. The weight of this beam when added to the basket support structure and transmission weights will total a tare weight of approximately 70 pounds. It can obviously be seen that in place of mounting motor 46 and its supports 47 to the housing 16 through reinforcing braces 48, the motor could be supported directly on the transmission support structure. Mounting the motor in this way would add the weight of the motor and its supports to the weight supported on beam 72, and would raise the tare weight to about 100 lbs. This added 30-pound weight would necessitate minor changes in construction which would in a small measure detract from the proper operation of the device, as shown.

As can be seen best in FIG. 2, beam 72 is in the form of an inverted channel. It passes under the machine central axis in its extent between opposed diagonal corners of the machine cabinet. At each of the opposed diagonal corners of the machine there are provided flanges 12.1 and strengthening braces 12.2 all serving to steady and brace the structure of machine 10 and casing 16. Beam 72 is pivotally supported on one brace 12.2 at the rearmost diagonal (pivot) end 73 of the beam and is supported at the opposite (free) end 74 on a compression spring 75. Compression spring 75 has been selected and calibrated so that it restores to a given length when supporting only the weight of the transmission mechanism 44, support structure 43 and spin basket 35. Spring 75 will compress allowing beam 72 to be depressed at its free end, when added weight in the form of water fill and clothes load is supplied to the interior of basket 35.

Figure 8:
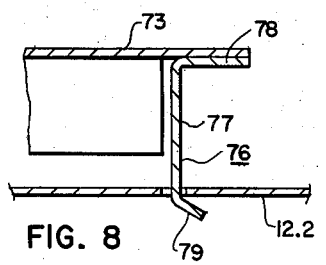
FIG. 8 is a sectional view taken along line 8—8 of FIG. 2.
Figure 9:
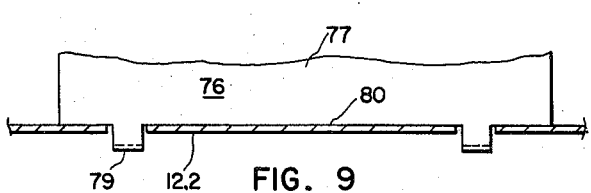
FIG. 9 is a sectional view taken along line 9—9 of FIG. 2.

Beam 72, as mentioned, is in the shape of an inverted channel with the channel web extending diagonally across the machine base between the parallel depending beam flanges. The beam is pivoted at its rearmost end at a fulcrum frame 76. This frame seen best in FIGS. 8 and 9 includes an upstanding supporting midsection 77 which spaces the beam end 73 a fixed distance above the adjacent corner brace 12.2. From the midsection, the frame is angled 90° into an upper horizontal bar support 78 which is fastened to the adjacent beam end by bolts and the like (not shown). The midsection 77 terminates at its lower end adjacent brace 12.2 with two angled hinge blades 79 extending from the frame 76 through similarly sized slots in the brace 12.2. Thus, the weight of beam 72 is supported through the securement to horizontal bar 78 to frame 76. The effect of the weight on frame 76 is transmitted through midsection 77 to a lower surface 80 which rests and bears on the upper surface of corner brace 12.2. The hinge blades 79 allow a limited rocking or pivotal motion of the beam and fulcrum 76 about the bearing surface 80.

Figure 11:
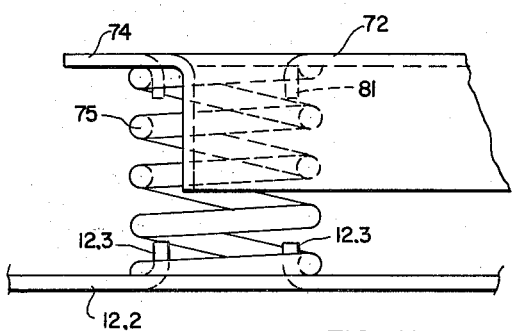
FIG. 11 is a side sectional view of the weight responsive spring as utilized herein.

At the free end, the beam 72 rests on the compression spring 75 as seen best in FIG. 11. The spring is calibrated to compress linearly when weights greater than the tare weight are applied at socket 70. The beam has a plurality of depending spaced tongues 81 extending into the hollow opening of the spring and to thereby maintain the relative positioning of the free end of the beam upon the spring. Upstanding from the corner brace 12.2 below spring 75 are vertical tongues 12.3 which serve to position the spring relative to the base diagonal corner.

In FIGS. 2 and 5, it can be seen that there is mounted from one corner brace 12.2 to the other, an upwardly open channel 12.4 which is below and substantially parallel to pivoted beam 72. This channel 12.4 is stationarily secured to the braces and near their widest edge and is somewhat shorter and narrower than beam 72 in extent. This channel 12.4 serves as the support base for a stationary stepped bracket 82 which is positioned within the web of channel 12.4 at a point approximately midway between the machine central axis and free end 74 of beam 72. This bracket 82 includes a horizontal guide bar 84 spaced a distance above web of channel 12.4 directly below beam 72 and extending horizontally for a distance of about six inches. Mounted on this bracket 82 in a horizontally slideable manner is a cam member 86. This cam member 86 includes two depending legs 88 and 90 which surround the body of horizontal bar 84. This surrounding is accomplished by fashioning a T-shaped slot 91 in each cam leg and fitting the slots astraddle the horizontal guide bar 84 of the bracket 82 as can be seen in FIG. 6. When assembled to the guide bar 84, this cam member has as its uppermost surface an oblique camming surface 92. This surface 92 provides a plane surface inclined at about 30° from the horizontal. Positioned directly above this cam surface is the actuating button 94 of a conventional microswitch 96. This microswitch is fastened to the beam arm 72 in a conventional manner allowing actuate button 94 to depend below the beam 72 to a position above and adjacent cam surface 92.

Looking a little more in detail at the cam construction, it can be seen in FIG. 5, that the cam member 86 has horizontal rail members 97 extending forwardly and rearwardly along the upper surface of the horizontal guide bar 84 to maintain the cam member in horizontal alignment on the guide bar 84. To fit the cam member on the spacing bracket, there is provided a necked section 98 adjacent the front leg 88 of the cam member. This neck is of narrow enough lateral dimension to accommodate the passage of T slot 91. The cross bar of the T slot is slightly greater in width than the adjacent basic width of the main portion of horizontal guide bar 84 to enable the cam legs to fit easily about the guide bar and to be slideable thereon without excess side movement. To rear leg 90, there is affixed stud 100 which, as mentioned, is secured by suitable means to a flexible Bowden wire 102. The wire is housed and protected for most of its length by a suitable sheath 103 within which the wire is free to move axially. This wire 102 extends through sheath 103, from the area of the cam member parallel to beam 72 to the rear diagonal corner of the machine from which it extends upwardly to a connection within the control console 20. This connection is made to a lever arm 104 which is pivoted at a central shaft 106. This shaft extends through the front of the controls console for connection to rotatable knob 25. By this connection, rotation of knob 25 and the consequent rotation of pivot arm 104 about shaft 106, causes wire 102 to be axially displaced depending on the direction of rotation and as a result will slide cam member 86 horizontally a distance equal to the travel of lever arm 104. Movement of the cam member thereby varies the height of the inclined plane cam surface directly below the actuate button 94. In this way, the knob provides a setting for the position of cam member 86 and the height of cam surface 92 directly below actuate button 94.

Figure 12:
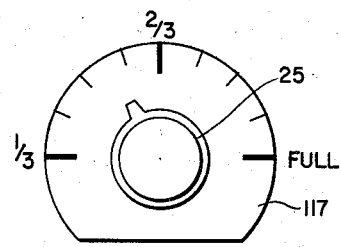
FIG. 12 is a front view of the fill control knob as employed herein.
Figure 13:
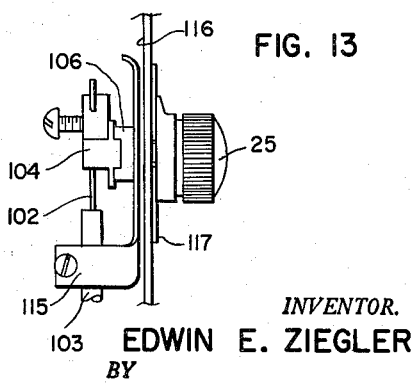
FIG. 13 is a side view of the knob of FIG. 12.

At the knob end of flexible wire 102, the sheath is secured stationarily to a suitable holding bracket 115 which is secured against the inner surface 116 of console 20. The bracket is held in place by suitable mounts secured in place by knob shaft 106. Within the sheath, the wire is free to move axially as governed by the motion of the control knob 25. As can be seen from the dial 117 of FIG. 12, the knob is movable through an arc encompassing approximately 180° and is marked with suitable indicia indicative of a plurality of positions between ⅓ full and fill. In FIG. 13, the knob setting is assumed to be representative of a one-half full condition. In this position, the wire end is drawn somewhat out of the sheath indicative of a rotation of the knob approximately 45° above ⅓ end. In FIG. 3, there is shown diagrammatically the position of the structure for fill of ⅓ to ½ full. For further movements of the knob, the wire end is bared for a greater length as it describes a semi-circle exposed from the sheath. In the full position with maximum exposure of the wire upper end from the sheath, cam surface 92 is drawn to a position similar to that shown diagrammatically in FIG. 4, in which the lower end of the inclined plane is below actuate button 94, thereby allowing more travel of beam 72 and button 94 prior to engagement and actuation of the switch.

Figure 10:
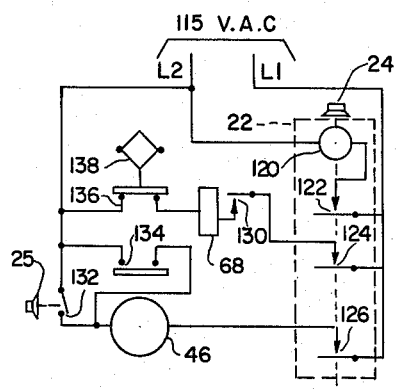
FIG. 10 is a simplified schematic circuit diagram to which my invention may be applied.

In FIG. 10, there is shown the portion of a washing machine control circuit necessary to explain the functioning of the invention. There is shown the control knob 24 with its allied control mechanism 22 which includes a conventional timer motor 120 with its cam actuated contacts 122, 124 and 126 which are time controlled in a generally known manner to open and close various control circuits at predetermined periods in the operative cycle. Contacts 122 are utilized to complete the circuit to timer motor 120 and would be closed by manual rotation of knob 24, and would remain closed functioning as a master switch for the entire machine operative cycle. Contacts 124 are connected in series with a switch 130 which in a conventional manner may be actuated to prepare the circuit for water inlet solenoid 68. Contacts 124 are closed whenever water fill is required and will be opened on the start of the next operation following fill. Contacts 126 control the path to drive motor 46. To complete the circuit to the drive motor 46, there are provided contacts 132 which are in microswitch 96, and which are normally open and will be closed only on actuation of the actuating button 94. Completing the circuit are first and second motor-controlled contacts 134 and 136 which are speed responsive under the control of motor centrifugal device 138. Contacts 134 are normally open and close only when the motor is rotating at a speed above a predetermined motor speed and serve to shunt out water fill contacts 132 to maintain the motor rotative. Contacts 136 are normally closed to complete the energizing path to water fill solenoid 68 and will open at motor speeds above a predetermined speed to keep the path to the solenoid open once the basket has been filled.

Prior to the start of an operative cycle, the user selects the quantity of fill required by manipulating knob 25 to the desired position. If a partial fill of roughly one-third is required, the knob is set at that position. Setting of the knob 25 pushes wire 102 until cam 86 assumes the position substantially as shown in FIGS. 3 and 5. This places the upper end of the cam member 86 below the actuate button 94. The operator then closes contact 130. The operator then sets knob 24 to the start position in the conventional manner. Setting of knob 24 closes cam controlled contacts 122, 124 and 126. Contacts 122 on closure complete a circuit from lead L1, through contacts 122 and timer motor 120 to lead L2. Contacts 124 complete a path from lead L1, through closed contacts 130, winding of solenoid 68, and normally closed switch contacts 136 to lead L2. Contacts 126 on closure prepare a circuit to the main drive motor 46, the circuit being now open at water fill switch contacts 132.

Energization of solenoid 68 supplies inlet water to the conduit 67. Water will enter the basket 35 and will accumulate in the base of the basket. The weight of the water being added to the basket cumulatively increases the weight of the basket assembly above the assembly tare weight of 70 pounds. The added weight imposed on beam 72 at socket 70, causes the beam to deflect downwardly against the resistance of compression spring 75. As the weight of the assembly acting on socket 70 increases, the beam 72 continues to depress until the preset fill of water has entered the basket. At that time, beam 72 has deflected an amount sufficient to lower button 94 into contact with the adjacent cam surface 92. For 1/3 fill, this engagement will occur when approximately four gallons have been supplied to the basket. With 1/3 fill, the weight of the four gallons of water (4 gals. x 8.3 lbs. per gal.) is equal to about 33 pounds. This weight in addition to the approximately 70 pounds tare weight plus a probable weight of about 3 pounds of clothes would amount to about 106 pounds. Spring 75 having been properly calibrated to compress a predetermined amount on the imposition of this weight, will compress causing beam 72 to pivot downwardly about its fulcrum 76. Downward movement of the beam free end 74 will lower button 94 into engagement with surface 92 and this engagement will close contacts 132. Closure of these contacts completes a path from lead L1 through cam contacts 126, drive motor 46, and closed contacts 132 to lead L2. Motor 46 is energized and is accelerated to the speed at which centrifugal mechanism 138 responds actuating contacts 134 and 136. Contacts 134 close shunting out contacts 132 of switch 96 and locking motor 46 operated. Contacts 136 are opened to open the circuit to the water fill solenoid 68. Deenergization of solenoid 68 terminates the water fill. The cycle then continues in the known and conventional manner oscillating the agitator to wash the clothes. Before the end of oscillation, cam contacts 124 open to further open the circuit to fill solenoid 68. Following the completion of agitation, the basket is spun to eject the water from basket 35 through holes 37 and out drain line 51. Following this spin, suitable circuitry may be employed, although not shown to allow the subsequent rinse fill to be a full timed fill or a partial (1/3) fill. The operational cycle then continues conventionally to rinse and then spin out the rinse water. With rotation of the motor in the spin direction, pump 50 is operated to remove drainage liquid in a known manner.

Now assuming that a full load of clothes (8 pounds dry) is placed in the basket and that full fill is selected by the user by manipulating knob 25 to the full position. This setting pulls wire 102 to move cam member 86 to the position of FIG. 4 where the low end of inclined plane 92 is below actuate button 94. It can readily be seen that at this fill setting, a greater amount of depression of beam 72 is required to place button 94 in contact with cam member 86. The user then completes the presetting of the operation by closing switch 130 to the proper temperature setting and by rotating time control knob 24 to the starting point. Rotation of knob 24 closes cam contacts 122, 124 and 126 as in the prior example. Cam 122 closes the circuit to timer motor 120, and contacts 124 close a circuit to solenoid 68 for fill. Contacts 126 prepare the drive motor circuit. Energization of the fill solenoid 68 supplies water to conduit 67 and basket 35 begins to fill with water. As full fill of 12 gallons (weighing about 100 pounds) is approached, the combined weight on socket 70 and beam 72 approaches 175–180 pounds. This weight deflects beam 72 downwardly against the resistance of compression spring 75, a distance proportional to the weight impressed. Finally, button 94 engages the adjacent cam surface low end and closes contacts 132 to energize drive motor 46 as described previously. The cycle then continues into the washing period. The conventional cycle operation continues in any known fashion.

While there has been described what is at present thought to be the preferred embodiment of the invention, it should be understood that it is my intent to cover in the appended claims all such modifications as fall within the true spirit and scope of the invention.

What is claimed is:

1. In a clothes washing machine having a receptacle adapted to contain water and clothes to be washed therein,
   a stationary frame structure including a cabinet having a base and a top provided with a control panel,
   a lever pivotally mounted on said base and extending transversely thereof,
   spring means interposed between said base and said lever to resiliently support the same,
   means for mounting said receptacle on said lever whereby the latter will be rotated under the weight of said receptacle and contents,
   electrically operated valve means for admitting water to said receptacle,
   an energy circuit including a switch mounted on said lever for controlling said valve means, an actuator for operating said switch from one to another circuit condition, structure mounted on said base in adjustable operative association with said actuator to cause the same to operate said switch to a desired one of said circuit conditions upon displacement of said actuator relative to said base, and means extending between said last-named structure and said control panel to adjust said structure relative to said actuator, whereby variably to establish the displacement of said actuator necessary to effect said desired switch circuit condition.

2. In a clothes washing machine of the type including a substantially imperforate liquid retentive receptacle, (a) a stationary frame structure, (b) means for mounting said receptacle to said frame structure allowing movement of said receptacle in a vertical sense, (c) said mounting means comprising a structure pivotally secured to said frame structure for movement with said receptacle, (d) means for admitting liquid to said receptacle to cause downward movement of said receptacle, (e) means for resisting the downward motion of said receptacle, (f) a switch mechanism mounted to one of said structures adjacent the end of said mounting means remote from the pivot of said mounting means, (g) a switch actuating member affixed to the other of said structures for engagement with said switch mechanism consequent to a predetermined amount of downward movement of said receptacle, (h) a variable height cam face on said member positioned engageably adjacent said switch mechanism for thereby actuating said mechanism, (i) and means for displacing said cam face relative to said switch mechanism to vary the spacing between said cam face and said switch mechanism and thereby to vary the amount of downward movement of said receptacle necessary to effect said engagement.

3. In a machine as claimed in claim 2, said cam face comprising an oblique planar surface movable horizontally to vary the vertical clearance of the planar surface relative to the switch mechanism and to thereby vary the response of said switch mechanism to liquid fill in said receptacle.

4. In a machine as claimed in claim 2, said cam face setting means comprising a manually rotatable dial and a wire member between said dial and said cam face to move said cam face relative to said switch mechanism upon manual rotation of said dial.

5. In a clothes washing machine having a receptacle adapted to contain water, a stationary frame structure, means for mounting said receptacle therein, said mounting means including mechanism adapted to be displaced under the weight of said receptacle and contents, means for establishing said mechanism in a control position representative of a predetermined weight of said receptacle and contents, a water inlet system for said receptacle, including electrically operated valve means, an energy circuit including switch means for control of said water inlet system, an actuator for operating said switch means from one to another circuit condition upon a predetermined departure of said mechanism from said control position, an adjustable cam means providing a sloping surface to be engaged by said switch actuator for operation of said switch means, and means disposed remote from said cam means to position a desired portion of said surface thereof in operative relationship to said actuator and thus establish a desired departure of said mechanism from said control position before the switch-operational engagement of said actuator with said cam surface.

6. In a clothes washing machine having a receptacle adapted to contain water, a stationary frame structure including a controls panel at an upper portion thereof, means for mounting said receptacle in said frame structure, said mounting means including mechanism vertically deflectable under the combined weight of said receptacle and contents, means for establishing said mechanism in a control position representative of a predetermined weight of said receptacle and contents, a water inlet system for said receptacle, including electrically operated valve means, an energy circuit including switch means for control of said water inlet system, said switch means being fixed to said deflectable mechanism, an actuator extending from said switch means for operating said switch means from one to another circuit condition, an adjustable cam means disposed on said frame structure, said cam means having a wall adapted to be engaged by said switch actuator for operation of said switch means, said wall being adapted to be variably spaced from said actuator to establish a desired travel of said actuator before engagement with said wall, cam adjustment means on said controls panel, and a mechanism between said adjustment means and said cam means to establish a desired spacing of said wall relative to said actuator.

7. In a clothes washing machine, a weight responsive structure comprising:

(a) a lever pivoted at one end, (b) bias means affixed to the remote end of said lever for resisting pivotal motion of said lever, (c) a rotatable receptacle containing varying weight supported mediately along said lever, (d) a switch mechanism depending from said lever adjacent the remote end thereof, a sloping surface beneath said mechanism for engaging therewith on depression of the remote end of said lever, (e) said bias means calibrated to allow a predetermined amount of motion of the remote end of said lever consequent to a predetermined weight of the receptacle and contents wherein said predetermined amount of motion is sufficient to cause engagement of said switch mechanism and said sloping surface, (f) means for adjusting the position of said sloping surface to vary the weight of said structure causing said engagement, (g) said adjusting means comprising a flexible wire member slideable horizontally to cause horizontal displacement of said sloping surface from the position of engagement at said predetermined conditions, (h) and a manually rotatable dial mechanism for sliding said wire member and effecting said displacement.

8. In a clothes washing machine having a receptacle adapted to contain water and clothes to be washed therein, a stationary frame structure including a cabinet having a base and a top provided with control-mounting means, means including a lever extending across said structure below said receptacle for mounting said receptacle within said cabinet, spring means for resiliently supporting said lever and thereon mounted receptacle to establish a position of said lever indicative of the weight of said receptacle and contents, means including an electrically operated valve for admitting water to said receptacle, electric switch means for controlling said valve, a switch operator mounted on said lever, said operator being biased to effect one circuit condition of said switch means and movable against said bias to effect another circuit condition, switch actuation structure adjustably mounted in the path of movement of said lever, and having a wall disposed for engagement with or disengagement from said operator whereby said operator establishes the switch means in one or another circuit condition according to the direction of movement of said lever, means for mounting said switch actuation structure to effect adjustment of the spacing between said wall and said operator, adjustment means disposed on said control-mounting means, and a mechanical linkage between said adjustment means and said switch actuation structure whereby a desired spacing between said wall and said switch operator may be established by appropriate operation of said adjustment means.

References Cited in the file of this patent
UNITED STATES PATENTS

| | | |
|---|---|---|
| 2,381,894 | Ferris | Aug. 14, 1945 |
| 2,554,672 | Johnston | May 29, 1951 |
| 2,885,879 | Bloom | May 12, 1959 |
| 2,911,811 | Clark | Nov. 10, 1959 |
| 2,973,193 | Castricone | Feb. 28, 1961 |